(12) United States Patent
Sasaki (10) Patent No.: US 11,820,333 B2
(45) Date of Patent: Nov. 21, 2023

(54) HUMIDITY MEASURING DEVICE AND DEW POINT TEMPERATURE MEASURING DEVICE

(71) Applicant: ASAHI KASEI KABUSHIKI KAISHA, Tokyo (JP)

(72) Inventor: Hiroyuki Sasaki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 707 days.

(21) Appl. No.: 16/584,980

(22) Filed: Sep. 27, 2019

(65) Prior Publication Data

US 2020/0101941 A1 Apr. 2, 2020

(30) Foreign Application Priority Data

Sep. 28, 2018 (JP) .................. 2018-185848

(51) Int. Cl.
*G01K 1/20* (2006.01)
*B60S 1/02* (2006.01)
(Continued)

(52) U.S. Cl.
CPC .............. *B60S 1/023* (2013.01); *G01K 13/00* (2013.01); *G01N 25/66* (2013.01); *G01N 27/045* (2013.01);
(Continued)

(58) Field of Classification Search
CPC ........ B60S 1/023; G01K 13/00; G01N 25/66; G01N 27/045; G01N 27/223; G01N 27/228; G01S 19/14
See application file for complete search history.

(56) References Cited

U.S. PATENT DOCUMENTS 4,355,894 A * 10/1982 Maeda ................... G01S 7/497
340/870.28
6,575,144 B2 * 6/2003 Hellar .................. F02D 41/064
701/115
(Continued)

FOREIGN PATENT DOCUMENTS

CA 2989240 A1 * 6/2018 ............. G01D 3/036
CN 106021757 A * 10/2016 ........... G06F 30/367
(Continued)

OTHER PUBLICATIONS

S40828-020-0111.6 ) Article "Barometric formulas: various derivations and comparisons to environmentally relevant observations", Lente, et al. [hereinafter Article].*
(Continued)

*Primary Examiner* — Gail Kaplan Verbitsky
(74) *Attorney, Agent, or Firm* — Morgan, Lewis & Bockius LLP (57) ABSTRACT

Relative humidity or dew point temperature depending on changes in barometric pressure is measured without using any barometric pressure sensor. A humidity measuring device includes an elevation obtaining unit configured to obtain elevation of a humidity measurement point, a barometric pressure calculating unit configured to calculate barometric pressure at the humidity measurement point from a calculation formula into which a value of the elevation obtained by the elevation obtaining unit is input, and a humidity correcting unit configured to correct humidity on a basis of a barometric pressure value calculated by the barometric pressure calculating unit.

11 Claims, 3 Drawing Sheets

(51) Int. Cl.
*G01N 27/22* (2006.01)
*G01N 27/04* (2006.01)
*G01K 13/00* (2021.01)
*G01N 25/66* (2006.01)
*G01S 19/14* (2010.01)

(52) U.S. Cl.
CPC ......... *G01N 27/048* (2013.01); *G01N 27/223* (2013.01); *G01N 27/228* (2013.01); *G01S 19/14* (2013.01); *G01K 1/20* (2013.01)

(56) References Cited

U.S. PATENT DOCUMENTS

| | | | |
|---|---|---|---|
| 7,509,838 B2 * | 3/2009 | Paukkunen | G01W 1/08 |
| | | | 73/335.04 |
| 7,900,464 B2 * | 3/2011 | Aoki | B60H 1/00785 |
| | | | 236/44 C |
| 10,003,714 B2 | 6/2018 | Eguchi et al. | |
| 2003/0024508 A1 * | 2/2003 | Hellar | F02D 41/021 |
| | | | 701/115 |
| 2008/0111029 A1 * | 5/2008 | Smolders | B64D 17/56 |
| | | | 244/152 |
| 2013/0067988 A1 | 3/2013 | Aoki et al. | |
| 2015/0292885 A1 | 10/2015 | Sasaki | |
| 2016/0041114 A1 * | 2/2016 | Le Neel | G01L 19/0092 |
| | | | 73/29.02 |
| 2016/0176246 A1 * | 6/2016 | Deniau | B60C 23/0408 |
| | | | 340/447 |
| 2017/0191458 A1 | 7/2017 | Morimura et al. | |
| 2017/0337745 A1 * | 11/2017 | Martin | G06T 19/006 |
| 2018/0059571 A1 | 3/2018 | Eguchi et al. | |
| 2019/0145834 A1 * | 5/2019 | Nakamura | G01K 7/16 |
| | | | 374/164 |

FOREIGN PATENT DOCUMENTS

| | | | | |
|---|---|---|---|---|
| CN | 107525828 A | * | 12/2017 | |
| CN | 112467173 A | * | 3/2021 | ........ H01M 8/04126 |
| DE | 10201184278 A1 | * | 4/2013 | |
| EP | 2246208 A2 | * | 11/2010 | ........ B60H 1/00785 |
| EP | 2583887 A1 | * | 4/2013 | ............. B62J 99/00 |
| EP | 3128318 A1 | * | 2/2017 | ........ F02D 41/1494 |
| FI | 127193 B1 | * | 1/2018 | ............. G01D 3/036 |
| JP | S59-075141 A | | 4/1984 | |
| JP | S61-110042 A | | 5/1986 | |
| JP | H07280767 A | * | 10/1986 | |
| JP | S62-212590 A | | 9/1987 | |
| JP | 63001949 A | * | 1/1988 | |
| JP | S63-019455 U | | 2/1988 | |
| JP | S63-142250 A | | 6/1988 | |
| JP | H05-273168 A | | 10/1993 | |
| JP | 2002-181753 A | | 6/2002 | |
| JP | 3611526 B2 | * | 1/2005 | |
| JP | 2005-029129 A | | 2/2005 | |
| JP | 2010-121953 A | | 6/2010 | |
| JP | 20010104281 A | * | 1/2011 | |
| JP | 2013-068456 A | | 4/2013 | |
| JP | 2013-170908 A | | 9/2013 | |
| JP | 2016-000972 A | | 1/2016 | |
| JP | 5961705 B2 | | 7/2016 | |
| JP | 2017-036935 A | | 2/2017 | |
| JP | 2017-058044 A | | 3/2017 | |
| JP | 20180073465 A | * | 7/2018 | |
| JP | 2018-144813 A | | 9/2018 | |
| KR | 20170050249 A | * | 5/2017 | |
| KR | 20180073465 A | * | 7/2018 | |
| PA | 2018-034369 A | | 3/2018 | |
| WO | WO-2005050259 A1 | * | 6/2005 | .............. G01W 1/08 |
| WO | 2018/037721 A1 | | 3/2018 | |
| WO | WO2018225986 A1 | * | 12/2018 | |

OTHER PUBLICATIONS

Notification of Termination of Reconsideration by Examiners before Appeal Proceedings issued in Japanese Patent Application No. 2018-185848 dated Jan. 24, 2023.

Reconsideration Report by Examiner before Appeal issued in corresponding Japanese Patent Application No. 2018-185848 dated Jan. 24, 2023.

* cited by examiner

HUMIDITY MEASURING DEVICE AND DEW POINT TEMPERATURE MEASURING DEVICE

TECHNICAL FIELD

The present invention relates to a humidity measuring device and a dew point temperature measuring device.

BACKGROUND ART

Conventionally, as devices for measuring dew point temperature, mirror surface cooling dew point temperature measuring devices are known. The principle of measurement by mirror surface cooling dew point temperature measuring devices is simply explained as follows: As a mirror surface installed in a space with certain temperature and humidity is gradually cooled, dew condensation occurs on the mirror surface, and the temperature of the mirror surface at which the dew condensation has begun is obtained as a dew point temperature. Additionally, in general, detection of dew condensation is visually performed. Thus, those devices can also be considered to be optical measuring devices.

Such mirror surface cooling dew point temperature measuring devices exhibit very high accuracy as measuring instruments. This is because the method for measuring dew point temperature described above matches with the definition of dew point temperature. Particularly, a specific characteristic of the devices, which is related to the object of the present invention, is that results of dew point temperature measurement by the devices are totally insensitive to changes in barometric pressure (atmospheric pressure). Due to the characteristic, mirror surface cooling dew point temperature measuring devices are often used as standard instruments.

On the other hand, however, there are many inconvenient problems in use of the devices. Three of the problems are mentioned below: Firstly, a mirror surface cooling mechanism is necessary; additionally, in the same circumstances, a mechanism for removing dew condensation on the mirror surface is also necessary; and, in addition thereto, automatic control and automatic recording are basically impossible since the mirror surface cooling dew point temperature measuring devices use the visual detection method.

As a specific example of application regarding the present invention, a technology is well known that, to prevent the occurrence of fogging or dew condensation on a car windshield, measures a dew point temperature of a car interior space (near the glass). In an actual operation, a surface temperature of the windshield is together measured to prevent the occurrence of fogging or dew condensation.

However, to prevent the occurrence of fogging or dew condensation, automatic control of an air conditioner in the car is an essential technology. Accordingly, obviously, mirror surface cooling dew point temperature measuring devices are not applicable, as described above.

These inconvenient problems arise in various situations, other than in car interior spaces. Thus, in general, a device for measuring dew point temperature often employs not a direct measuring method, as mentioned above, but a method of measuring the interior temperature of a space and other physical quantities and then converting them to dew point temperature. The method for converting to dew point temperature is roughly classified into two methods as below.

A first method is a method of measuring wet-bulb temperature and barometric pressure, in addition to the interior temperature of a space. In this case, the interior temperature of the space is referred to as dry-bulb temperature. Water vapor pressure is obtained from values thereof by using Sprung formula, and converted via relative humidity to dew point temperature.

A second method is a method of (directly) measuring relative humidity, in addition to the interior temperature of a space. Note that this is equivalent to the fact that absolute humidity is only known. Any physical quantity thereof is converted to dew point temperature.

CITATION LIST

Patent Literature

PTL 1: JP S59-75141 A
PTL 2: JP 2005-29129 A
PTL 3: JP Pat. No. 5961705

SUMMARY OF INVENTION

PTL 1 and 2 disclose technologies describing details of the two methods described above.

PTL 1 discloses a relative humidity measuring device using the technology of the first method. When dew point temperature is necessary, as in the present invention, it is possible to obtain dew point temperature from relative humidity and dry-bulb temperature obtained by the relative humidity measuring device. However, the measuring method by the relative humidity measuring device requires a measurement value of wet-bulb temperature to obtain a relative humidity value. As is well known, to measure wet-bulb temperature, the bulb portion of a thermometer needs to be wet with gauze containing water or the like. However, use of the method of wetting the bulb portion of the thermometer in this way makes miniaturization of the device difficult, as well as requires regular repair work. Therefore, for example, when measuring dew point temperature in a car, the size and place of the relative humidity measuring device are greatly restricted, which shows that after all, the device is not suitable for the measurement.

On the other hand, PTL 2 discloses a device in which a compact sensor element for measuring relative humidity is applied in a car. With use of a relative humidity measurement value measured by the sensor element and, additionally, a car interior temperature obtained by measuring the interior temperature of the car, dew point temperature can be obtained by Tetens formula or the like. Moreover, the sensor element for measuring relative humidity is generally compact, so that the size and place thereof are less restricted.

However, when seen from a technological viewpoint, the method for obtaining dew point temperature from a relative humidity measurement value and the interior temperature of a car also fluctuates depending on changes in barometric pressure, as in PTL 1. Accordingly, as long as dew point temperature is obtained via relative humidity, changes in barometric pressure need to be considered even when employing the method of PTL 2. Furthermore, while PTL 1 has considered changes in barometric pressure by using the Sprung formula, PTL 2 has neither considered nor suggested changes in barometric pressure at all. In fact, there are no other patent documents that disclose a technology suggesting consideration on changes in barometric pressure.

Furthermore, one difficult problem will be described that is not solvable by the above-described two patent documents.

The problem is that, in any case, the presence of a barometer (a barometric pressure sensor) for measuring barometric pressure is essential in conventional technologies including the above two patent documents. In other words, it is directly associated with increases in cost and size. Such circumstances are particularly very important indicators in the application for measuring dew point temperature in a car described as the specific example. Therefore, there has been a desire for a technology using no barometric pressure sensor.

It is an object of the present invention to provide a humidity measuring device and a dew point temperature measuring device configured to measure relative humidity or dew point temperature depending on changes in barometric pressure, without incorporating a barometric pressure sensor, even in situations where barometric pressure often changes in a relatively short period of time, as in cars.

In order to achieve the above object, according to an aspect of the present invention, there is provided a humidity measuring device including a function of correcting humidity on a basis of a barometric pressure value, the humidity measuring device including: an elevation obtaining unit configured to obtain elevation of a point where the humidity measuring device is located; and a barometric pressure calculating unit configured to calculate barometric pressure at the point on a basis of the elevation obtained by the elevation obtaining unit.

According to another aspect of the present invention, there is provided a dew point temperature measuring device including: a humidity measuring unit configured to measure relative humidity; an elevation obtaining unit configured to obtain elevation of a point where the humidity measuring unit is located; a barometric pressure calculating unit configured to calculate barometric pressure at the point on a basis of the elevation obtained by the elevation obtaining unit; a humidity correcting unit configured to correct the relative humidity on a basis of a barometric pressure value calculated by the barometric pressure calculating unit a temperature measuring unit configured to measure temperature of the point where the humidity measuring device is located; and a dew point temperature calculating unit configured to calculate dew point temperature by using the relative humidity corrected by the humidity correcting unit and the temperature measured by the temperature measuring unit.

In the one aspect of the present invention, without need of any barometric pressure sensor, relative humidity or dew point temperature depending on barometric pressure can be obtained while being accurately corrected. Thus, miniaturization and cost reduction of the device can be achieved.

DESCRIPTION OF EMBODIMENTS

In the following detailed description, lots of specific and concrete configurations will be described to provide complete understanding of embodiments of the present invention. However, it would be apparent that other embodiments can be carried out without such specific and concrete configurations. Further, the following embodiments do not limit the invention according to the claims, but include all combinations of characteristic configurations described in the embodiments.

Referring to the drawings, an embodiment of the present invention will be described. In the description of the drawings, same or similar elements are denoted by the same reference signs. The drawings, however, are schematic and relations between thicknesses and two-dimensional dimensions, ratios between thicknesses of respective layers, and the like may be different from actual ones.

(Structure of Humidity Measuring Device)

Figure 1:
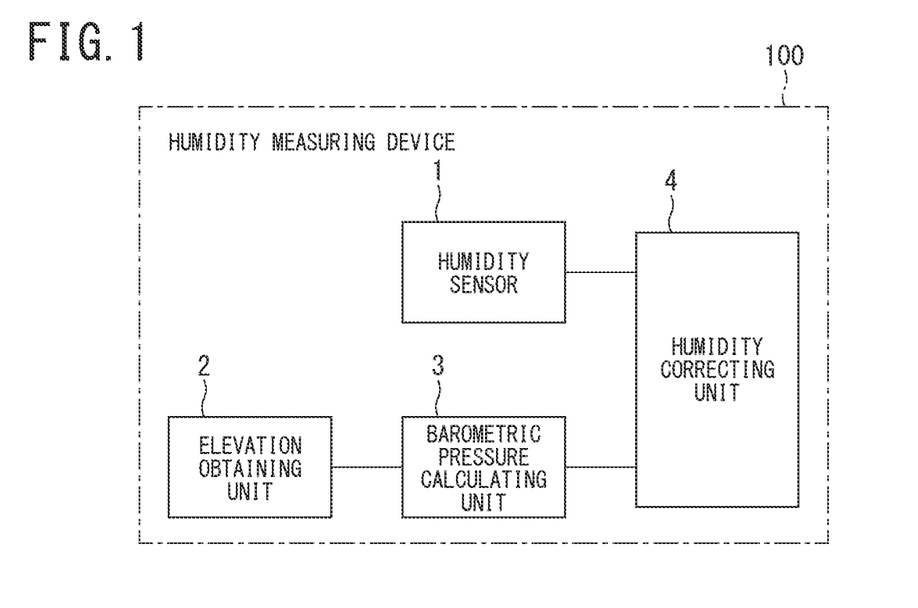
FIG. 1 is a diagram illustrating one example of the entire image of a humidity measuring device to which the present invention is applied.

FIG. 1 is a diagram of a humidity measuring device 100 to which a humidity or dew point temperature measuring device according to the present invention is applied, the diagram being a block diagram illustrating the entire image of the humidity measuring device 100.

In FIG. 1, reference sign 1 denotes a humidity sensor (a humidity measuring unit). The humidity sensor to be used in the present invention includes a relative humidity sensor, an absolute humidity sensor, and a humidity sensor in which conversion to humidity is performed after directly obtaining dew point temperature. However, specifically, most products are of relative humidity output type. These humidity sensors include dry and wet bulb hygrometers and semiconductor sensor type humidity sensors.

Reference sign 2 denotes an elevation obtaining unit. This block is a block configured to obtain the elevation of a place where the humidity sensor 1 is located. Details thereof will be described later.

Reference sign 3 denotes a barometric pressure calculating unit. The most distinctive feature of the barometric pressure calculating unit 3 in the present invention is to calculate barometric pressure from the elevation obtained by the elevation obtaining unit 2. Due to the presence of the barometric pressure calculating unit 3, a barometer or a barometric pressure sensor can be unnecessary. In general, barometers and barometric pressure sensors are relatively large in size, high in cost, and not very frequently used (for example, as compared with humidity sensors). The present invention can eliminate such disadvantages.

Reference sign 4 denotes a humidity correcting unit. The value of relative humidity is generally dependent on barometric pressure. The humidity correcting unit 4 is a block configured to correct a relative humidity value in accordance with a result of calculation of barometric pressure. For example, the above-mentioned Sprung formula is given as follows:

Water vapor pressure=saturated water vapor pressure of wet bulb−barometric pressure×(dry-bulb temperature−wet-bulb temperature)/1510 (Formula 1)

Specifically, in the calculation method of Formula 1, barometric pressure, dry-bulb temperature, and wet-bulb temperature, respectively, are read from measuring instruments. The saturated water vapor pressure of wet bulb is obtained from wet-bulb temperature by using a numeration table or the like, as a result of which water vapor pressure on the left side can be obtained.

Additionally, relative humidity can be obtained using a saturated water vapor pressure obtained from the dry-bulb temperature and the water vapor pressure obtained by Formula 1, as given in Formula 2:

Relative humidity=water vapor pressure/saturated water vapor pressure of dry-bulb temperature     (Formula 2)

Formula 2 is applicable only to dry and wet bulb type hygrometers, but a similar correction method can be applied even in semiconductor type humidity sensors. In that case, correction may be performed not based on the Sprung formula but based on characteristics of individual humidity sensors.

(Structure of Dew Point Temperature Measuring Device)

Figure 2:
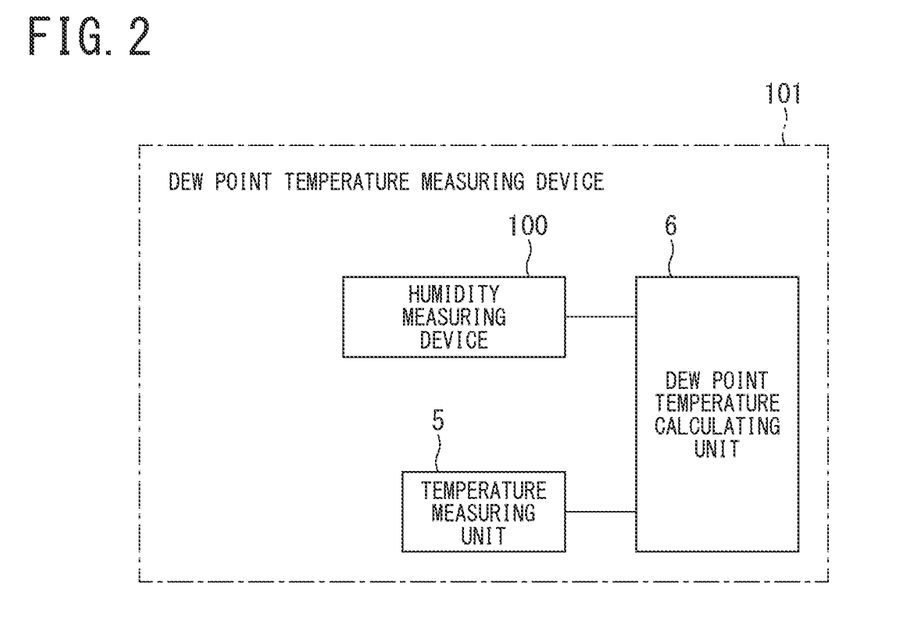
FIG. 2 is a diagram illustrating one example of a dew point temperature measuring device using the humidity measuring device of FIG. 1.

FIG. 2 is a block diagram illustrating one example of a dew point temperature measuring device 101 configured to calculate a dew point temperature by using the humidity measuring device 100 of FIG. 1. The dew point temperature measuring device 101 includes the humidity measuring device 100, a temperature measuring unit 5, and a dew point temperature calculating unit 6.

To obtain dew point temperature, it is necessary to use not only relative humidity but also the value of a temperature near the humidity sensor. The temperature is measured by the temperature measuring unit 5. With use of the temperature value measured by the temperature measuring unit 5, a saturated water vapor pressure (a saturated water vapor quantity) near the humidity sensor can be calculated, for example, by using the Tetens formula.

Hereinafter, a method for calculating dew point temperature by the dew point temperature calculating unit 6 will be described using specific numerical values.

Assume that the relative humidity calculated using the humidity measuring device 100 of FIG. 1 is 40%. Additionally, assume that, at that time, the temperature near the humidity measuring device 100 measured by the temperature measuring unit 5 is 25° C. In this case, from the Tetens formula, the saturated water vapor pressure at the temperature of 25° C. is calculated to be 31.69 hPa. Accordingly, the water vapor pressure near the humidity measuring device 100 is calculated to be as follows:

31.69 hPa×40%=12.68 hPa

Dew point temperature is a temperature at which the water vapor pressure is a saturated water vapor pressure. Therefore, by using the Tetens formula inversely with respect to the above, the dew point temperature can be calculated to be 10.5° C. The relative humidity calculated by the humidity measuring device 100 indicates a value obtained in consideration of the barometric pressure. Thus, the dew point temperature calculated using the relative humidity obtained in consideration of the barometric pressure is a dew point temperature obtained in consideration of the barometric pressure.

Note that the method for calculating dew point temperature is not limited to the method for obtaining dew point temperature from relative humidity and temperature, illustrated in FIG. 2 above. Actually, it would be sufficient to obtain the value of water vapor pressure, and as long as the value thereof is obtainable, the values of relative humidity and temperature may be unnecessary.

(Structure of Elevation Obtaining Unit)

Next, two specific examples of the elevation obtaining unit 2 of the humidity measuring device 100 will be described.

Figure 3:
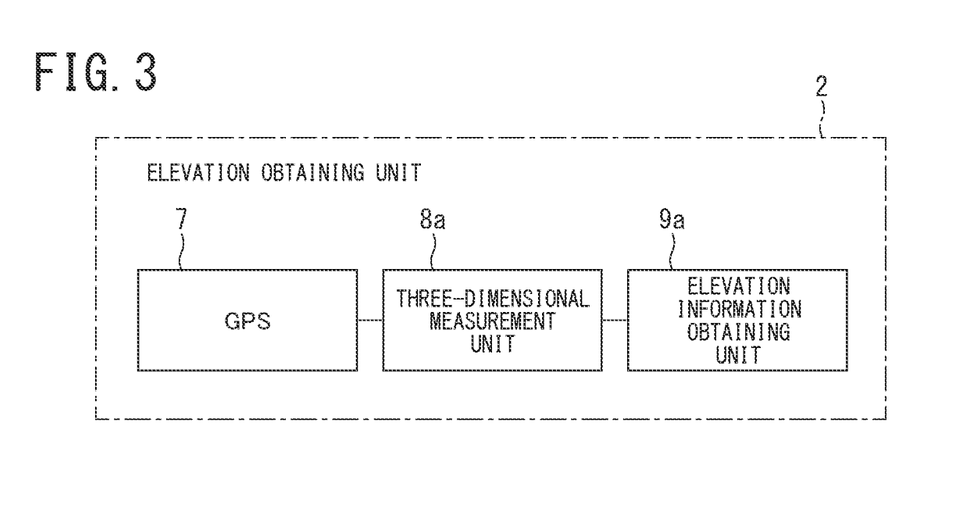
FIG. 3 is a diagram illustrating the structure of a first example of an elevation obtaining unit of the present invention.

First, FIG. 3 is a block diagram illustrating the structure of a first example of the elevation obtaining unit 2.

In FIG. 3, reference sign 7 denotes a global positioning system (GPS). To say precisely about objects for measurement, the GPS 7 includes a GPS satellite and a GPS receiver. Specifically, the GPS receiver is located near the humidity sensor 1 of the humidity measuring device 100, and receives a radio wave from the GPS satellite.

In FIG. 3, reference sign 8a denotes a three-dimensional measurement unit. The three-dimensional measurement unit 8a is a block configured to three-dimensionally obtain the present position of the GPS receiver (humidity sensor 1) on the earth on the basis of the radio wave received by the GPS receiver. The term "three-dimensional" is defined to mean that ellipsoidal height can be obtained simultaneously in addition to latitude and longitude.

In FIG. 3, reference sign 9a denotes an elevation information obtaining unit. The three-dimensional measurement unit 8a can obtain only ellipsoidal height, as described above, and thus, performs conversion to information of elevation by using numerical value information on a geoid height and the like. Actually, only after the conversion thereto has been done, it is possible to obtain elevation by three-dimensional measurement.

Figure 4:
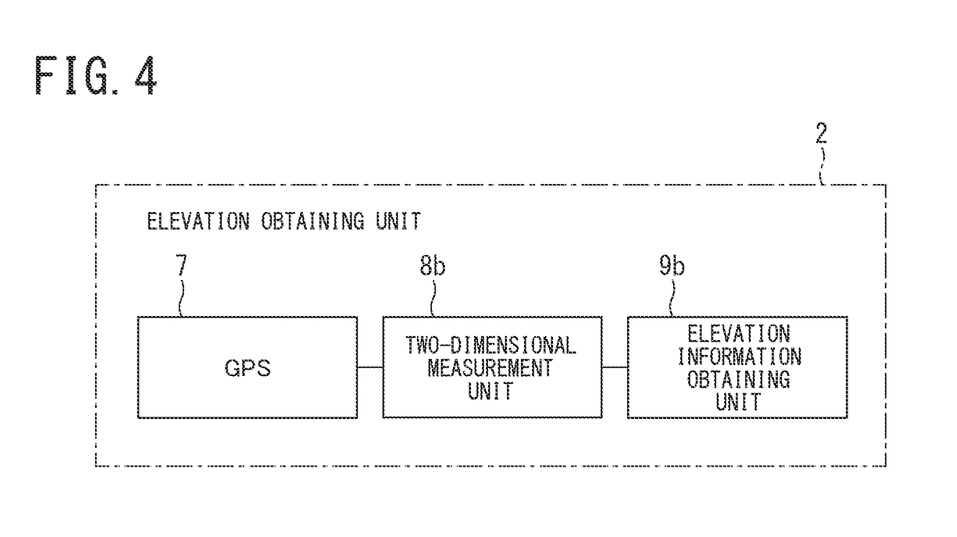
FIG. 4 is a diagram illustrating the structure of a second example of the elevation obtaining unit of the present invention.

Next, FIG. 4 is a block diagram illustrating the structure of a second example of the elevation obtaining unit 2.

In FIG. 4, reference sign 7 denotes exactly the same GPS as the GPS 7 of FIG. 3. On the other hand, reference sign 8b denotes a two-dimensional measurement unit. The two-dimensional measurement unit 8b obtains only the latitude and longitude of the present GPS receiver, i.e., the humidity sensor 1 located near the GPS receiver (and does not obtain the ellipsoidal height thereof).

The two-dimensional measurement unit 8b sends information on the latitude and the longitude to an elevation information obtaining unit 9b. The elevation information obtaining unit 9b is different from the elevation information obtaining unit 9a, and stores an elevation value of a point at the latitude and the longitude in a predetermined storage region (whose typical example is, for example, a digital map). Elevation can be obtained by reading the stored value.

When incorporating any of the two examples of the elevation obtaining unit 2, for example, in a car navigation system, it is, basically, system software that determines which should be selected. However, for example, when radio wave intensity from the GPS satellite is weak, it may be impossible, even if desired, to perform three-dimensional measurement as in the first example of the elevation obtaining unit 2. In such a case, two-dimensional measurement is an essential technology, as in the second example of the elevation obtaining unit 2.

(Modification of Humidity Measuring Device)

Figure 5:
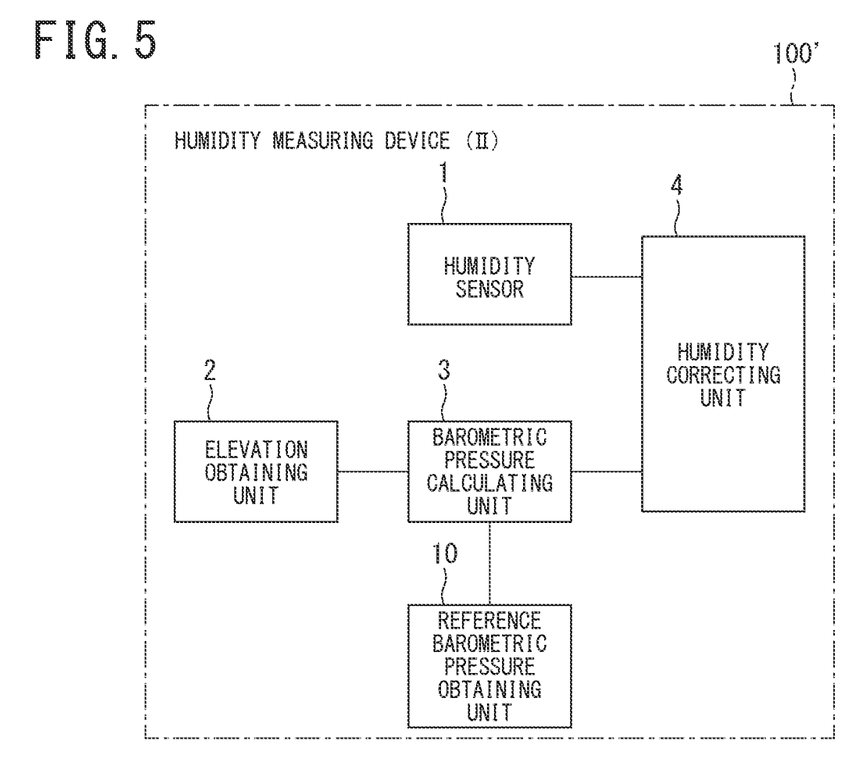
FIG. 5 is a diagram illustrating the entire image of another example of the humidity measuring device to which the present invention is applied.

FIG. 5 is a block diagram illustrating a modification of the humidity measuring device 100 of FIG. 1.

In a humidity measuring device (II) 100' illustrated in FIG. 5, a humidity sensor 1, an elevation obtaining unit 2, a barometric pressure calculating unit 3, and a humidity correcting unit 4 are the same blocks as the respective units of FIG. 1, and also have the same functions as those of the units. However, there are cases where it is not sufficient to use only these units to achieve the object of the present invention. For example, natural phenomena caused by a typhoon attack or the like cause changes in barometric pressure (reduced barometric pressure in the case of a typhoon), leading to reduction in humidity accuracy.

For example, when examining sea level pressures in Tokyo in the year of 2017, the annual average value thereof is 1013 hPa, whereas the minimum value is 967 hPa, in which actually there is such a big difference of 46 hPa therebetween. To reduce influence of the difference, a reference barometric pressure obtaining unit 10 may be provided. Specifically, with use of a reference barometric pressure obtained by the reference barometric pressure obtaining unit 10, barometric pressure is calculated as follows:

For example, as clearly stated in PTL 3, an altitude between certain two points can be calculated using an appropriate conversion factor by the following height measurement formula (Formula 3). Note that "loge" in Formula 3 represents natural logarithm.

Altitude=−loge(barometric pressure/reference barometric pressure)×1013.25×conversion factor (Formula 3)

When Formula 3 above is applied to the present invention, it is preferable to set a point to be used for the reference of altitude, as one of the two points, and select barometric pressure at the point as a reference barometric pressure. This is because since the reference of altitude is 0 m above sea level, altitude directly indicates the value of elevation. Furthermore, a barometric pressure value at the point used as the reference of altitude is sequentially released in weather maps or the like, so that the value thereof is available anytime and anywhere through a device such as a car navigation system.

Based on consideration on Formula 3, the barometric pressure value obtained as the barometric pressure at the point used as the reference of altitude can be set for reference barometric pressure in the denominator of the natural logarithm of Formula 3, and a barometric pressure value at a point where the device of the present invention is located can be set for barometric pressure in the numerator of the natural logarithm thereof. Then, with use of Calculation Formula 4 solving Formula 3 for barometric pressure, it is possible to more accurately calculate a barometric pressure value by the barometric pressure calculating unit 3.

Barometric pressure=reference barometric pressure× exp(−elevation/(1013.25×conversion factor)) (Formula 4)

(Defogging Control Device)

Figure 6:
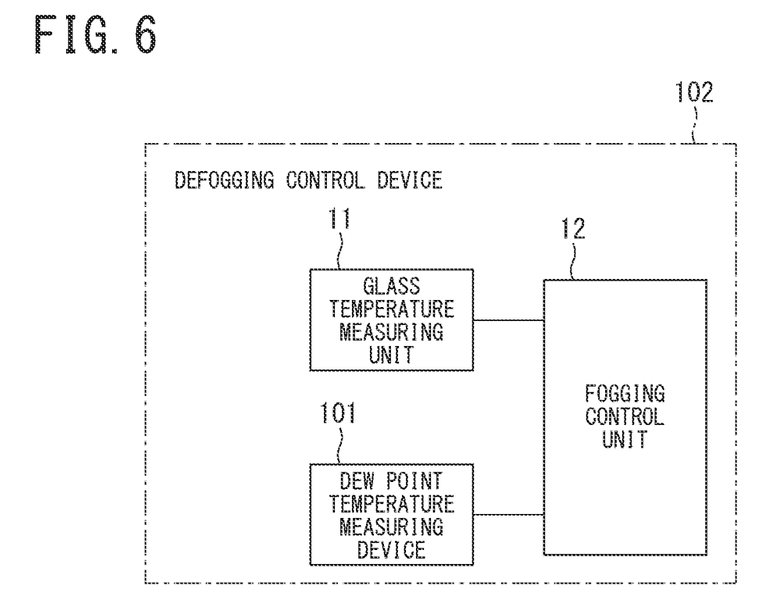
FIG. 6 is a diagram illustrating a schematic structure of a defogging control device to which the present invention is applied.

Lastly, a description will be given of a defogging control device 102 using the present humidity measuring device 100, a control method therefor, and advantageous effects obtained when the present invention is applied to the defogging control device 102.

FIG. 6 is a block diagram illustrating one example of the defogging control device 102. Here, the defogging control device 102 will be described as a defogging control device configured to control defogging of a car windshield.

In FIG. 6, the dew point temperature measuring device 101 is assumed to be a device incorporating the humidity correcting unit 4 using the technology of the present invention. In other words, the dew point temperature measuring device 101 includes the humidity measuring device (II) 100' illustrated in FIG. 5 as the humidity measuring device.

On the other hand, a glass temperature measuring unit 11 of FIG. 6 is a thermometer for measuring the temperature of glass (a component different from the temperature measuring unit 5 in the present invention). As the thermometer, a contact thermometer, such as a thermocouple or a thermistor, or a non-contact thermometer such as a radiation thermometer is used.

Additionally, as illustrated in FIG. 6, the defogging control device 102 includes a fogging control unit 12. In principle, the glass becomes foggy when a dew point temperature measured by the dew point temperature measuring device 101 is higher than the temperature of glass measured by the glass temperature measuring unit 11. Based on the principle, the fogging control unit 12 determines whether or not the glass becomes foggy. Furthermore, when the fogging control unit 12 has determined that the glass becomes foggy, the fogging control unit 12 performs, for example, control of an unillustrated air conditioner to control air conditioning so that the glass does not fog.

Hereinafter, advantageous effects of the present invention will be quantitatively described by exemplifying the defogging control device 102.

First of all, respective comparative reference values are set as below:

Elevation: 0 m above sea level
Barometric pressure: 1013 hPa
Temperature (dry-bulb temperature): 25° C.
Wet-bulb temperature: 16.3° C.

A saturated water vapor pressure at the wet-bulb temperature of 16.3° C. is calculated to be 18.54 hPa. Accordingly, water vapor pressure at that time is calculated by the Sprung formula, as below:

18.54 hPa−1013 hPa×(25−16.3)÷1510=12.69 hPa

On the other hand, since the saturated water vapor pressure at the dry-bulb temperature of 25° C. is 31.69 hPa, relative humidity at that time is 12.69 hPa÷31.69 hPa=40%, and then, dew point temperature is calculated to be 10.5° C.

After that, for example, assume that the car traveled and reached from the comparative reference point to a point at an elevation of 2000 m above sea level. Barometric pressure at that time is obtained using Formula 4 mentioned above, as below:

(conversion factor: 8.6 m/hPa)

1013×exp(−2000÷1013.25÷8.6)=805 hPa

If the temperature (dry-bulb temperature) and the wet-bulb temperature are invariable, water vapor pressure is calculated by using the Sprung formula, as below:

18.54 hPa−805 hPa×(25−16.3)÷1510=13.90 hPa

In this case, relative humidity is 44%, and dew point temperature is 11.9° C. In other words, both relative humidity and dew point temperature change to higher levels. When checking such changes against the advantageous effect of the present invention, the changes have important implications as below.

Specifically, when the present invention is not used (when not performing humidity correction and dew point temperature correction in accordance with barometric pressure), the dew point temperature at the point at 0 m above sea level is 10.5° C., so that the glass does not fog if the glass temperature is, for example, 11.0° C. (because the glass temperature is higher than the dew point temperature). However, when the point at 2000 m above sea level is reached (if other all conditions are assumed to be invariable), the measured dew point temperature remains 10.5° C. despite that the actual dew point temperature is 11.9° C. Thus, the glass fogs at the glass temperature of 11.0° C. In other words, although the glass is foggy, determination by measurement does not determine that the glass is foggy, due to which defogging control is not performed at all. Accordingly, the windshield remains foggy. This is a very unfavorable state during driving.

On the other hand, when the present invention is used, humidity correction and dew point temperature correction in accordance with barometric pressure are performed, so that dew point temperature can be accurately recognized to be 11.9° C. by measurement. In other words, even in determination by actual measurement, the glass is determined to be foggy, as in the actual situation. Accordingly, defogging control is performed instantaneously (in practical use, before glass temperature becomes lower than dew point temperature), as a result of which there can be obtained a satisfactory visual field during driving.

The advantageous effect as described above is one example of the case where "although defogging is necessary, defogging control is not performed". Additionally, as the opposite situation, there may occur an error case where "although defogging is actually unnecessary, defogging is performed". However, even in such an error case, applying the present invention in the same manner can avoid wasteful consumption of unnecessary air conditioning control energy. For example, in the case of a car, it is possible to provide an advantage where fuel efficiency or cruising distance is improved.

Note that the description up to here is of the correction calculation method in the case of use of the dry and wet bulb type hygrometer. However, even in the case of use of a semiconductor sensor type humidity sensor, a substantially similar discussion can be developed although specific calculation formulae and the like are different. For example, in a resistive humidity sensor, correction calculation may be made in accordance with changes in resistance with respect to barometric pressure, and, in a capacitive humidity sensor, correction calculation may be made in accordance with changes in capacitance with respect to barometric pressure. Specific calculation formulae and the like are optimally determined by characteristics of the respective semiconductor sensors.

While some embodiments of the present invention have been described hereinabove, the above embodiments exemplify devices and methods for embodying the technological idea of the present invention, where the technological idea of the present invention does not limit the materials, shapes, structures, arrangement, and the like of constituent components. The technological idea of the present invention may be variously modified within the technological scope defined by the appended claims.

REFERENCE SIGNS LIST

1: Humidity sensor (humidity measuring unit)
2: Elevation obtaining unit
3: Barometric pressure calculating unit
4: Humidity correcting unit
5: Temperature measuring unit
6: Dew point temperature calculating unit
7: GPS (global positioning system)
8a: Three-dimensional measurement unit
8b: Two-dimensional measurement unit
9a: Elevation information obtaining unit
9b: Elevation information obtaining unit
10: Reference barometric pressure obtaining unit
11: Glass temperature measuring unit
12: Fogging control unit
100: Humidity measuring device
100': Humidity measuring device (II)
101: Dew point temperature measuring device
102: Defogging control device

The invention claimed is:

1. A humidity measuring device, comprising:
an elevation obtaining unit configured to obtain elevation of a point where the humidity measuring device is located;
a reference barometric pressure obtaining unit configured to obtain a barometric pressure information of a reference position;
a barometric pressure calculating unit configured to calculate barometric pressure at the point on a basis of the elevation obtained by the elevation obtaining unit and the barometric pressure information obtained by the reference barometric pressure obtaining unit;
a humidity measuring unit configured to measure relative humidity of a car cabin;
a humidity correcting unit configured to correct the relative humidity on a basis of the relative humidity measured by the humidity measuring unit and result of calculation of the barometric pressure; and
an output unit configured to output the relative humidity corrected by the humidity correcting unit,
wherein the barometric pressure information of the reference position is an information of barometric pressure of a reference point at 0 meter above sea level which is obtained from a weather map,
wherein the barometric pressure calculating unit calculates the barometric pressure on a basis of the elevation obtained by the elevation obtaining unit, the reference barometric pressure obtained by the reference barometric pressure obtaining unit, a constant value, and a conversion coefficient, by the following equation:

barometric pressure=reference barometric pressure×
exp(−elevation/constant value×conversion coefficient)).

2. The humidity measuring device according to claim 1, wherein the elevation obtaining unit obtains the elevation from a measurement result of a global positioning system.

3. The humidity measuring device according to claim 1, wherein the elevation obtaining unit obtains the elevation on a basis of elevation data on a map obtained by a global positioning system.

4. The humidity measuring device according to claim 2, wherein the global positioning system is a global positioning system incorporated in a car navigation system.

5. The humidity measuring device according to claim 1, wherein the humidity is relative humidity, and the humidity measuring device comprises a capacitive sensor or a resistive sensor configured to measure the relative humidity.

6. A dew point temperature measuring device, comprising:
a humidity measuring unit configured to measure relative humidity of a car cabin;
an elevation obtaining unit configured to obtain elevation of a point where the humidity measuring unit is located;
a reference barometric pressure obtaining unit configured to obtain a barometric pressure information of a reference position;
a barometric pressure calculating unit configured to calculate barometric pressure at the point on a basis of the elevation obtained by the elevation obtaining unit and the barometric pressure information obtained by the reference barometric pressure obtaining unit;
a humidity correcting unit configured to correct the relative humidity on a basis of the relative humidity measured by the humidity measuring unit and a barometric pressure value calculated by the barometric pressure calculating unit;

a temperature measuring unit configured to measure temperature of the point where the humidity measuring device is located; and a dew point temperature calculating unit configured to calculate dew point temperature by using the relative humidity corrected by the humidity correcting unit and the temperature measured by the temperature measuring unit, wherein the barometric pressure information of the reference position is an information of barometric pressure of a reference point at 0 meter above sea level which is obtained from a weather map, wherein the barometric pressure calculating unit calculates the barometric pressure on a basis of the elevation obtained by the elevation obtaining unit, the reference barometric pressure obtained by the reference barometric pressure obtaining unit, a constant value, and a conversion coefficient, by the following equation:

barometric pressure=reference barometric pressure×exp(−elevation/constant value×conversion coefficient)).

7. The dew point temperature measuring device according to claim 6, wherein the elevation obtaining unit obtains the elevation from a measurement result of a global positioning system.

8. The dew point temperature measuring device according to claim 6, wherein the elevation obtaining unit obtains the elevation on a basis of elevation data on a map obtained by a global positioning system.

9. The dew point temperature measuring device according to claim 7, wherein the global positioning system is a global positioning system incorporated in a car navigation system.

10. The dew point temperature measuring device according to claim 6, wherein the humidity measuring unit comprises a capacitive sensor or a resistive sensor configured to measure the relative humidity.

11. The dew point temperature measuring device according to claim 6, comprising a glass temperature measuring unit configured to measure temperature of glass; and a fogging control unit configured to perform defogging control of the glass on a basis of the dew point temperature calculated by the dew point temperature calculating unit and the temperature of the glass measured by the glass temperature measuring unit.

* * * * *